Oct. 22, 1968     J. BOSTON     3,406,828
HOME TAP WATER PURIFICATION DEVICE
Filed Sept. 6, 1966     2 Sheets-Sheet 1
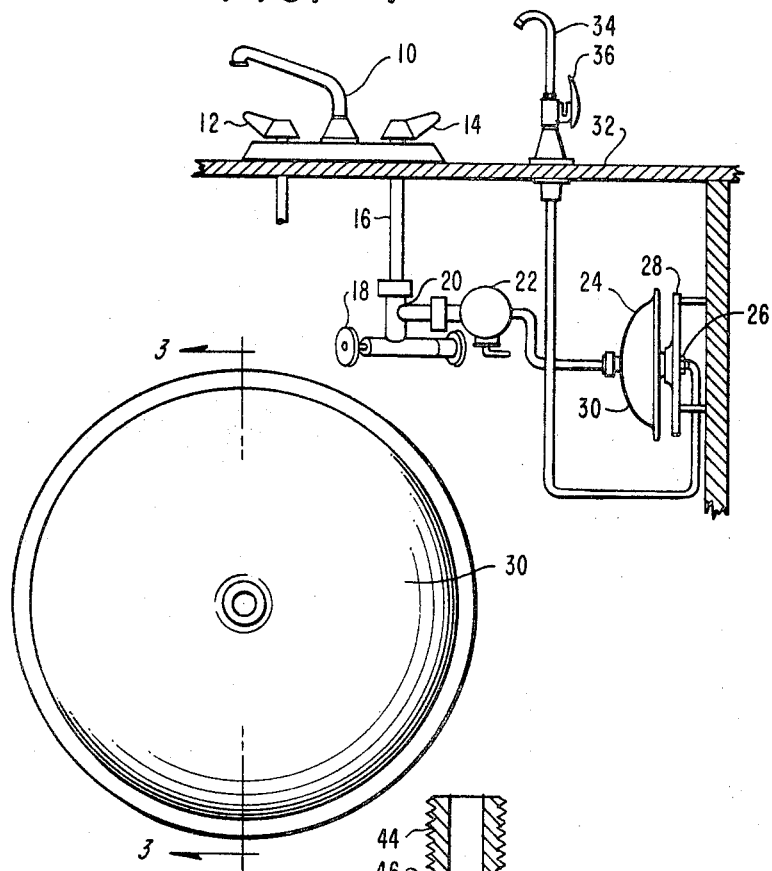
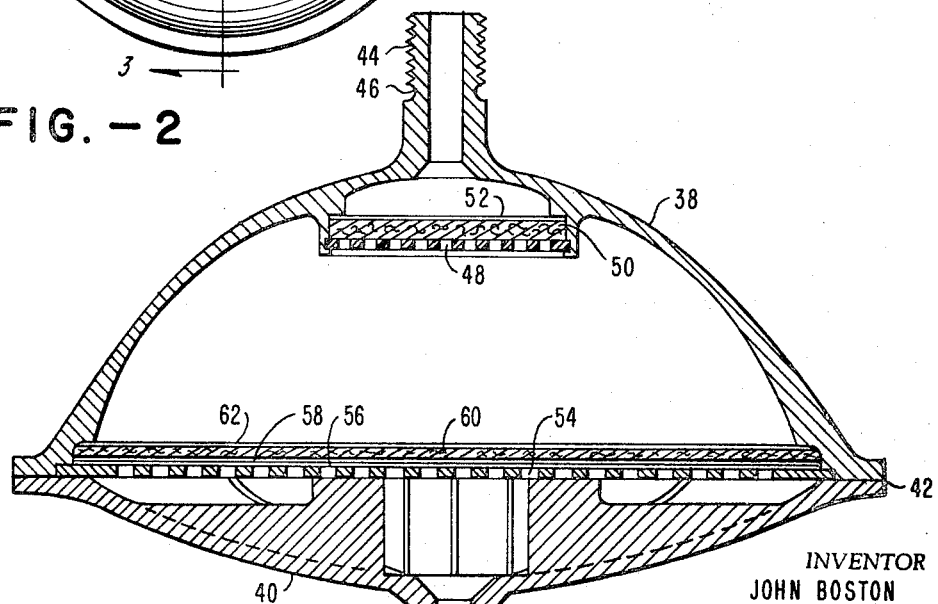
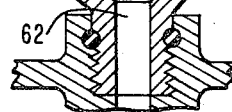
INVENTOR
JOHN BOSTON
BY
ATTORNEY Oct. 22, 1968   J. BOSTON   3,406,828
HOME TAP WATER PURIFICATION DEVICE
Filed Sept. 6, 1966   2 Sheets-Sheet 2

INVENTOR
JOHN BOSTON
BY Sanford Astor
ATTORNEY

United States Patent Office 3,406,828
Patented Oct. 22, 1968

3,406,828
HOME TAP WATER PURIFICATION DEVICE
John Boston, Canoga Park, Calif., assignor to Aquarius Industries, North Hollywood, Calif., a corporation of California
Filed Sept. 6, 1966, Ser. No. 577,284
3 Claims. (Cl. 210—137)

ABSTRACT OF THE DISCLOSURE

The invention relates to a system for purifying water from the ordinary household tap. A unitary replaceable filter system, composed of filter pads and charcoal impregnated pads, is held in a bell-shaped filter unit and tubing is provided to pass the tap inlet water through the filter and then to the faucet. In a preferred embodiment the water is passed first through the valve and then through the filter element to increase filter life and reduce pressure on the filter system.

---

This invention relates to a system for the purification of water. More particularly it relates to a system for the purification of water entering the home or a business for use by persons, in which the water is purified continuously as it leaves the tap.

Every time a person turns on a faucet he is performing an act of faith. He assumes the water he drinks and the water with which he cooks and washes is fit for human use.

Water pollution from sewage and industrial wastes is a series problem which has recently come to the public's attention. If a person analyzed the water he drank he might be shocked.

Many persons buy bottled water, which of course is purified at the plant by the selling concern. This is cumbersome and inconvenient, not to say expensive. However, its use is constantly increasing due to the concern of persons over the pollution problem and for their health.

It is an object of the present invention to provide a simple continuous method for purification of the water used in the home.

It is a further object of this invention to provide a system which can readily be adapted to the sink tap to purify the water used in the home or business.

Still a further object of this invention is to provide a system for constantly purifying tap water to remove contaminants such as bacteria, algae, rust, and dissolved solids.

Yet a further object of this invention is to constantly purify tap water to remove disagreeable color, taste and odor, to provide a fresh new taste to coffee, tea, juices, and all other drinks.

These and other objects of the invention will become obvious from the description and drawings in which:

FIG. 1 is a schematic view of the system of the present invention,

FIG. 2 is a front elevational view of the filter element of the present invention, FIG. 3 is a cross-sectional view taken on line 3—3 of FIG. 2.

Figure 4:
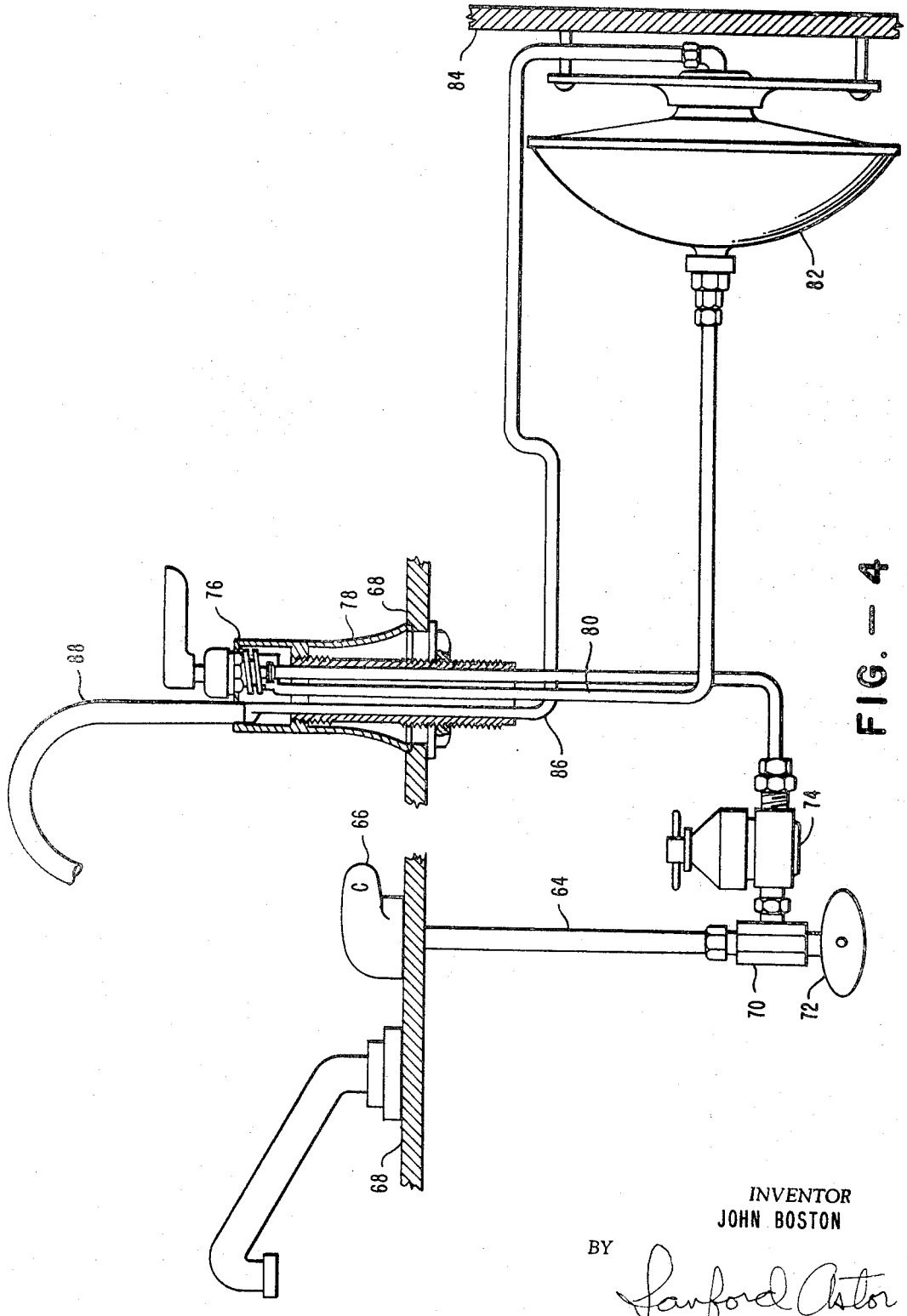
FIG. 4 is a schematic view of another embodiment of the system of the present invention.

Referring now to the drawings there is shown in FIG. 1 a common household tap 10 with hot 12 and cold 14 handles. Incoming cold water enters through incoming pipe 16 controlled by valve 18. The system of the present invention is easily inserted into the household sink by inserting adapter 20 into incoming pipe 16. The incoming water then passes through pressure regulator 22 into the filter element 24.

The filter element 24 consists of the outlet 26, the base plate 28, and the purifier 30. After passing through the purifier the purified tap water is passed through the sink top 32 to faucet 34, controlled by valve 36.

FIG. 2 shows the purifier element 30 indicating a round bell shaped unit. This unit may be any convenient shape, however the bell shaped unit is easiest to assemble and use.

FIG. 3 shows a cross-section of purifier unit 30 in which bell section 38 and support section 40 are fixedly attached such as by a chemical sealant, at their circumference 42, to hold the filtering elements. Bell section 38 is provided with a threaded neck 44 for threadable attachment to the line. Neck 44 is provided with an O-ring groove 46 for sealing purposes. At the neck 44 or inlet end of bell section 38 there is fixedly attached and inserted a plastic grid 48 which is of sufficient strength to hold a felt filter pad 50 and a wood pulp filter pad 52 against the incoming water pressure.

At the interface of bell section 38 and support section 40 adjacent exit neck 62 is fixedly attached a perforated grid mesh 54 preferably made of plastic which has sufficient strength to hold wood pulp filter pads 56 and 58, an impregnated asbestos pad 60 and another wood pulp filter pad 62. Grid 54 does not provide any filtering action and contains spaces large enough to provide no resistance to the flow of water. Its purpose is purely to support the filtering elements 56, 58, 60 and 62.

The fact that three wood pulp pads 56, 58, and 62 are shown in only a preferred embodiment, and more or less pads may be employed as desired by the operator.

In addition other filtering elements (not shown) which may be desirable for a specific filtering purpose may be inserted between the elements shown, such as between pad 58 and pad 60. The elements which may be employed include other known filtering media such as diatomaceous earth. Other particular filtering media known in the art, necessary for a particular local filtering problem may be included in the system.

Impregnated pad 60 consists of an asbestos pad impregnated with activated carbon or charcoal, which are well known. Other activated filtering media may be included or may replace carbon, however activated carbon is preferred.

The water after passing through the filtering media passes through exit neck 62 and up to use at the sink top.

FIG. 4 shows an alternative system for insertion into a sink which reduces wear on the filter and increases its life by eliminating the pressure on the filter unit when the water is turned off. This is provided by placing the sink valve between the incoming line and the filter unit. There is shown incoming water line 64 to cold water tap 66 through sink top 68. Adapter 70 is inserted in line 64 controlled by valve 72 to provide water to be purified. The water passes through pressure regulator 74 through valve tap 76 inserted in housing 78 above sink top 68. The water then passes back down through filter line 80 into filter unit 82 fixedly attached to the sink cabinet wall 84 and through the filter unit 82 back up through delivery line 86 to delivery spout 88. Thus when valve 76 is closed the pressure on filter element 82 is relieved.

At intervals the filter element must be replaced when it is clogged with contaminants removed from the incoming tap water. This is done by simply removing the entire filter element, such as 82, and replacing it with another unit. The filtering system of the present invention will filter on the average 150 to 170 gallons of water before replacement of the unit is necessary.

The effectiveness of the system of the present invention has been shown in tests conducted on common tap water as follows, wherein tap water was passed through the system described in FIG. 1.

TEST SERIES A

|  | Tap water | Test 1, 101st gallon | Test 2, 61st gallon | Commercial Bottled Water |
|---|---|---|---|---|
| Particulate Matter Particles/ 100 ml. | 1,200 | 60 | 20 | 70 |
| Chlorine, p.p.m. | 2,070 | 0 | 0 | 0 |

A test was conducted to determine the effectiveness of removal of bacteria *Escherichia* (*E.*) *coli* which was seeded into ordinary tap water which had been treated to remove residual traces of chlorine.

TEST SERIES B
[*E. coli* per 100 ml.]

Test 1:
    Tap water _____ 380,000
    Filtered _____ 2.2 (.00057%)
Test 2:
    Tap water _____ 120,000
    Filtered _____ 4.4 (.0036%)

Thus, purified water is readily provided continuously at the tap at a cost which on the average runs $3.50 per 150–170 gallons as compared to about $27.00 per 150–170 gallons for commercial bottled water.

While preferred embodiments have been shown to best describe the invention, it can readily be seen that changes can be made without departing from the nature and spirit of the invention as described in the following claims.

I claim:
1. A device for the purification of tap water comprising: a feed line to divert the flow of tap water from the incoming line, a unitary disposable bell-shaped filtering unit having an inlet end, a filtering media supported by a plastic grid contained in said inlet end, an exit end having a filtering media supported by a plastic grid adjacent said exit end, a sink-top control valve positioned between said inlet line and said filtering unit effective to close the water pressure on said filtering unit and a pressure regulator in said feed line.

2. The device of claim 1 wherein said filtering media comprises an asbestos pad impregnated with activated charcoal.

3. The device of claim 1 wherein said filtering media comprises a combination of wood felt filter pads and an asbestos pad impregnated with activated charcoal.

References Cited

UNITED STATES PATENTS

| 184,920 | 11/1876 | Simes et al. | 210—449 |
| 494,837 | 4/1893 | Bellamy | 210—316 |
| 582,496 | 5/1897 | Avery | 210—449 X |
| 2,314,357 | 3/1943 | Lehman | 210—449 |
| 2,523,881 | 9/1950 | Shea | 210—316 |
| 2,773,601 | 12/1956 | Keller et al. | 210—287 X |
| 3,184,064 | 5/1965 | Sampson et al. | 210—287 X |

REUBEN FRIEDMAN, *Primary Examiner.*

F. SPEAR, *Assistant Examiner.*